L. S. MAXSON.
NUT LOCK.
APPLICATION FILED JAN. 20, 1915.
1,161,499.
Patented Nov. 23, 1915.
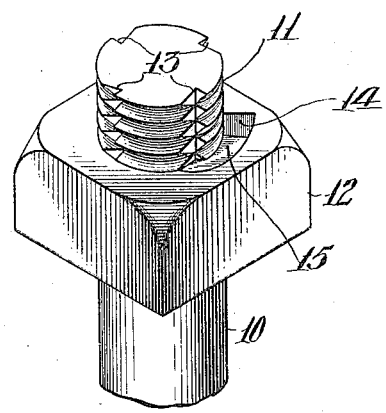
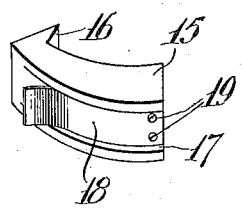
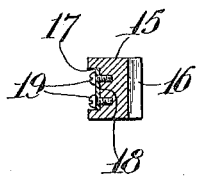
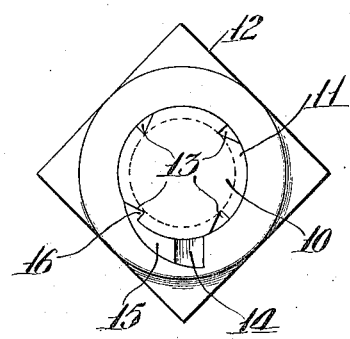
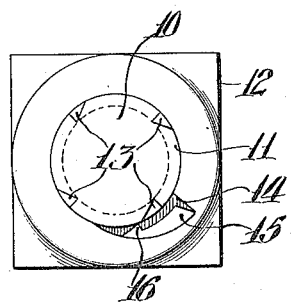
Witnesses:—
Louis W. Gratz
Ford W. Harris
Inventor
Levi S. Maxson
by his attorney

UNITED STATES PATENT OFFICE.

LEVY S. MAXSON, OF THE UNITED STATES NAVY, ASSIGNOR TO ELLA D. TOWNSEND, OF MONTEBELLO, CALIFORNIA.

NUT-LOCK.

1,161,499. Specification of Letters Patent. Patented Nov. 23, 1915.

Application filed January 20, 1915. Serial No. 3,416.

*To all whom it may concern:*

Be it known that I, LEVY S. MAXSON, of the United States Navy, a citizen of the United States, have invented a new and useful Nut-Lock, of which the following is a specification.

The invention relates to nut locks, and has for its pricipal object the provision of a nut lock in which the locking means positively engages the bolt, and prevents the nut from being disengaged from the bolt by the vibrations of the machinery in which it is used.

In the drawings which are for illustrative purposes only: Figure 1 is a perspective view of a bolt equipped with a nut lock embodying my invention. Fig. 2 is a perspective view of the wedge used in the invention. Fig. 3 is a cross-sectional view of wedge used in the invention. Fig. 4 is a plan view of the bolt, nut, and wedge in place in the locked position. Fig. 5 is a plan view of the same parts with the wedge in the disengaged position.

In these drawings a bolt 10 is threaded at 11, and a nut 12 similarly threaded is placed thereon in the usual manner. The threads 11 have a series of grooves 13 cut therein, these grooves extending longitudinally of the bolt 10. The nut 12 is provided with a tapered recess 14, in which is placed a wedge 15, this wedge having a projecting tooth 16 of a suitable size to fit into the grooves 13. A channel 17 is formed on the back of wedge 15, and a light spring 18 is secured by screws 19 or other suitable means therein.

The wedge 15 is placed in the opening 14, the tooth 16 being held in engagement with the end of the bolt 10 by means of the spring 18. When the nut 12 is screwed on to the bolt 10 the wedge 15 is held in the position shown in Fig. 5, and the nut moves freely on the bolt. When, however, a reverse movement of the nut is attempted, the tooth 16 is forced into one of the grooves 13, by the spring 18, and the wedge 15 is rotated into the small end of the groove 14 wedging firmly therein, and gripping the nut 12, and the bolt 10 frictionally, in addition to the very positive locking action of the tooth 16.

It will be seen that as the wedge is driven into the small end of the tapered recess that it frictionally grips between the nut and the bolt, the amount of this gripping depending on the angle of the wedge. The tooth 16 simply provides a positive means for throwing the wedge into position and is not depended on for locking the nut and bolt together, the wedging action of the wedge 15 providing a very efficient and positive lock.

I claim as my invention:

1. A nut lock comprising a nut having a threaded bore, a tapered opening adjacent to said bore, a wedge shaped locking device sliding in said wedge shaped opening, a bolt threaded to fit into the threaded opening in said nut and having a series of shallow grooves formed therein, and a tooth on said locking device adapted to be engaged by one of said grooves, the parts being so arranged that the locking device is wedged in said opening by the rotation of the nut gripping between the tops of the threads of said bolt and the walls of said opening, the grooves in the bolt and the tooth on the locking device serving merely to draw the locking device into the locking position.

2. A nut lock comprising a nut having a threaded bore, a tapered opening adjacent to said bore, a wedge shaped locking device sliding in said wedge shaped opening, a bolt threaded to fit into the threaded opening in said nut and having a series of shallow grooves formed therein, a tooth on said locking device adapted to be engaged by one of said grooves, and means for holding said tooth against said bolt in any position of said locking device in said opening, the parts being so arranged that the locking device is wedged in said opening by the rotation of the nut gripping between the tops of the threads of said bolt and the walls of said opening, the grooves in the bolt and the tooth on the locking device serving merely to draw the locking device into the locking position.

3. A nut lock comprising a nut having a threaded bore, a tapered opening adjacent to said bore, a wedge shaped locking device sliding in said wedge shaped opening, a bolt threaded to fit into the threaded opening in said nut and having a series of shallow grooves formed therein, a tooth on said locking device adapted to be engaged by one of said grooves, and means for elastically holding said tooth against said bolt in any position of said locking device in said opening, the parts being so arranged that the locking device is wedged in said opening by the rotation of the nut gripping between the tops of the threads of said bolt and the walls of said opening, the grooves in the bolt and the tooth on the locking device serving merely to draw the locking device into the locking position.

4. A nut lock comprising a nut having a threaded bore, a tapered opening adjacent to said bore, a wedge shaped locking device sliding in said wedge shaped opening, a bolt threaded to fit into the threaded opening in said nut and having a series of shallow grooves formed therein, a tooth on said locking device adapted to be engaged by one of said grooves, and a leaf spring secured to the back of said wedge shaped locking device in such a manner as to hold said tooth against said bolt in any position of said locking device in said opening, the parts being so arranged that the locking device is wedged in said opening by the rotation of the nut gripping between the tops of the threads of said bolt and the walls of said opening, the grooves in the bolt and the tooth on the locking device serving merely to draw the locking device into the locking position.

In testimony whereof, I have hereunto set my hand at Mare Island, California, this 2d day of January, 1915.

LEVY S. MAXSON.

In presence of—
B. MADRID,
CHAS. S. KUNAST.

Copies of this patent may be obtained for five cents each, by addressing the "Commissioner of Patents, Washington, D. C."